Figure 4:
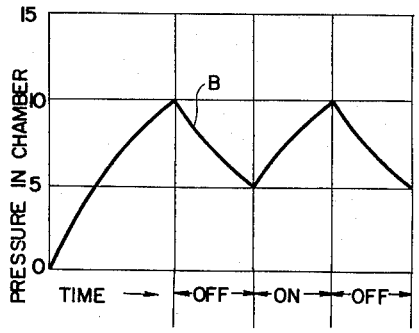

Dec. 18, 1962
O. SCHARPF
3,069,088
CONTROL MECHANISM
Filed Dec. 19, 1960
2 Sheets-Sheet 1
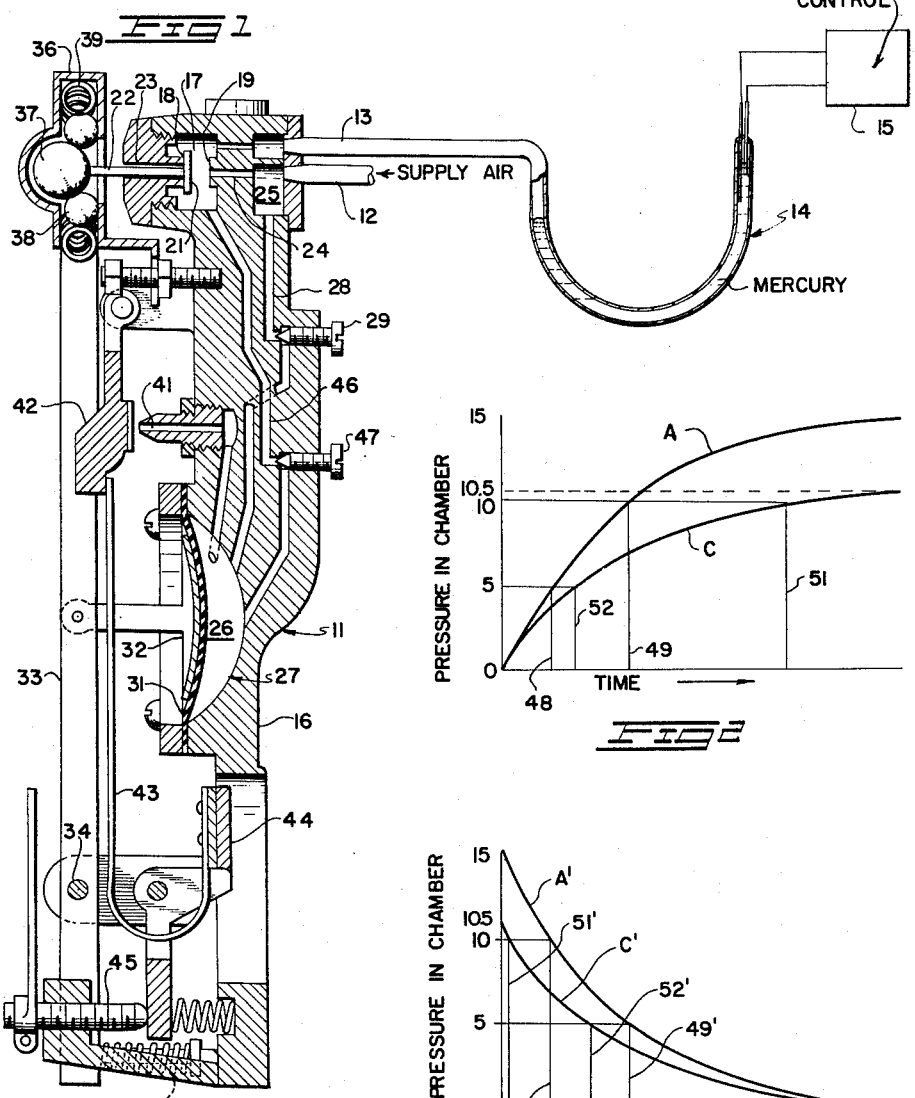
INVENTOR
Otto Scharpf
BY Dodge and Sons
ATTORNEYS Dec. 18, 1962  O. SCHARPF  3,069,088
CONTROL MECHANISM
Filed Dec. 19, 1960  2 Sheets-Sheet 2

INVENTOR
Otto Scharpf

BY Dodge and Sons
ATTORNEYS

United States Patent Office

3,069,088
Patented Dec. 18, 1962

3,069,088
CONTROL MECHANISM
Otto Scharpf, Milwaukee, Wis., assignor to Johnson Service Company, Milwaukee, Wis., a corporation of Wisconsin
Filed Dec. 19, 1960, Ser. No. 76,582
6 Claims. (Cl. 236—83)

This invention relates to pulse generators.

The object of the invention is to provide a device for producing pneumatic pressure pulsations from a constant supply pressure. In a more limited sense, the invention affords a pulse generator in which the duration or length of the pressure pulse may be varied gradually between minimum and maximum limits. In a still more limited case, and this is the preferred embodiment, the maximum and minimum limits are infinity and zero whereby, within each cycle, the device is capable of affording pulsations of any desired duration.

The invention finds utility in many environments, but the preferred embodiment is particularly useful in temperature control systems employing electrical resistance heaters. These systems are well known and usually include a timer controlled switch which periodically closes and opens the circuit connecting the heater with the source of current to thereby turn the heater on and off. Each system also includes a temperature-responsive device which automatically controls the timer in such manner that the relationship between the "on" and "off" times is varied. In this way, the quantity of heat which is introduced into the space whose temperature is being controlled is related to the temperature deviation from the set point.

The pulse generator of the preferred embodiment of this invention also includes a temperature-responsive element which serves to vary the duration of the output pulses. The branch line to which these pulses are transmitted is connected with a pressure-responsive switch that controls the heater circuit. As the temperature varies from the set point, the duration of the pulse is varied gradually a proportional amount and in a sense which tends to restore heat balance. This arrangement is simpler and less expensive than the prior art timer controlled switches, and is sufficiently compact that it may be fitted into the cover of a conventional room thermostat.

The preferred embodiment will be described in detail with reference to the accompanying drawings, in which:

FIG. 1 is a cross-sectional view of the pulse generator including, in schematic form, portions of the system in which it is used.

FIG. 2 is a graph illustrating the pressure build-up in motor chamber 26 for two settings of the lid 42 assuming that needle valve 29 is closed and neglecting the effect of the snap action mechanism.

FIG. 3 is a graph illustrating the pressure decay in motor chamber 26 for the same two settings of lid 42 assuming that needle valve 29 is closed and neglecting the effect of the snap action mechanism.

Figure 5:
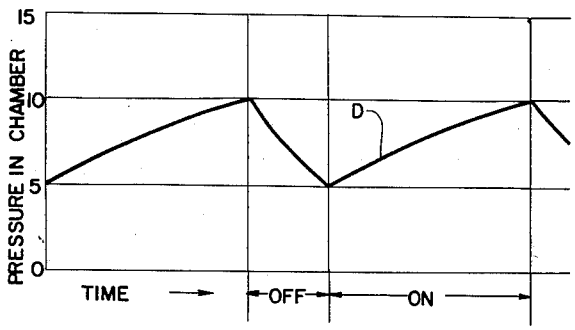

FIGS. 4 and 5 are graphs illustrating the pressure variations in motor chamber 26 for the two settings of the lid 42 used in FIGS. 2 and 3 assuming that needle valve 29 is closed but taking into account the effect of the snap action mechanism.

Figure 6:
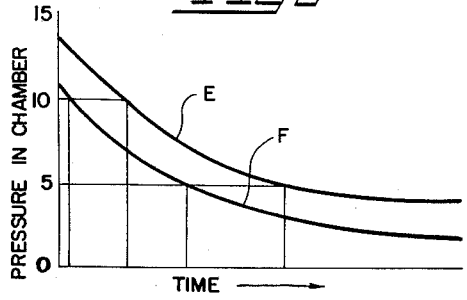

FIG. 6 is a graph illustrating the pressure decay in motor chamber 26 for two settings of lid 42 assuming needle valve 29 is partially open but neglecting the effect of the snap action mechanism.

Figure 7:
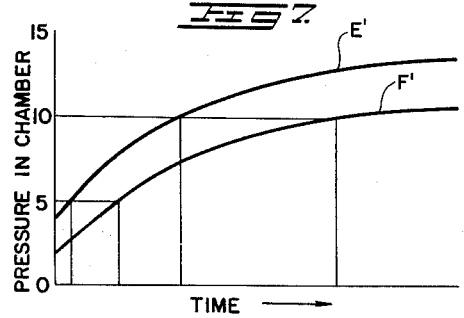

FIG. 7 is a graph illustrating the pressure build-up in motor chamber 26 for the two settings of lid 42 used in FIG. 6 assuming needle valve 29 is partially open but neglecting the effect of the snap action mechanism.

Figure 8:
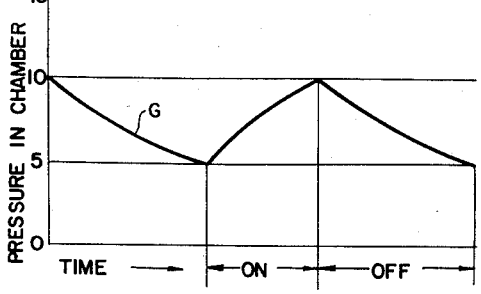
Figure 9:
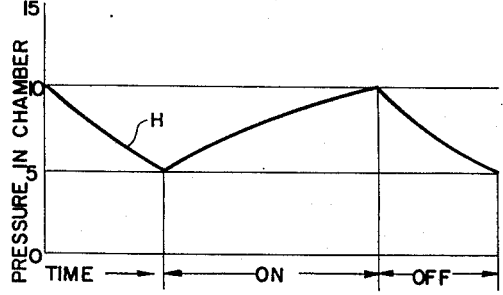

FIGS. 8 and 9 are graphs similar to FIGS. 4 and 5 illustrating the pressure variations in motor chamber 26 for the two settings of lid 42 used in FIGS. 6 and 7 assuming the needle valve 29 is partially open and taking into account the effect of the snap action mechanism.

As shown in FIG. 1, the basic structural arrangement of the pulse generator 11 is that employed in the thermostat of Fortier Patent 1,109,913, granted September 8, 1914. The pulse generator 11 is provided with a supply line 12 which communicates with a source of compressed air at constant pressure, and a branch line 13 which is connected with the mercury switch 14 that is arranged in circuit with the electric heater control 15. This control 15 is arranged to energize the electrical heater when switch 14 is closed and to de-energize the heater when switch 14 is opened.

The pulse generator 11 includes a casing 16 formed, at its upper end, with a chamber 17 communicating with branch line 13 and containing oppositely directed seats 18 and 19 and a plate valve 21 carried on a stem 22. From the seat 18 an exhaust passage 23 leads to the atmosphere around stem 22 while a supply passage 24 leads to the seat 19 from a supply chamber 25 that is in communication with the supply line 12. Supply chamber 25 is connected with the working chamber 26 of a diaphragm motor 27 by a passage 28 containing an adjustable restrictor or needle valve 29.

The diaphragm 31 of motor 27 carries a plate 32 which is pivoted to the actuating lever 33 which, in turn, is pivoted at 34 to the casing 16. Lever 33 is biased in the clockwise direction about its pivot by a spring 35 and carries, at its upper end, a case 36 which surrounds the ball 37 attached to the outer end of valve stem 22. Encircling ball 37 is a series of smaller balls 38 that is urged radially inward by a surrounding annular coil spring 39. The balls 37 and 38, stem 22, and the spring 39 constitute a snap action mechanism which connects the diaphragm or movable member of motor 27 with plate valve 21.

Associated with the working chamber 26 is a leak port comprising a restricted vent passage 41 and a lid or flapper valve 42. The lid 42 is so weighted that it swings into sealing engagement with the end of passage 41 and is moved in the opposite direction by a curved bimetallic bar 43 carried by the pivoted bracket 44. The position of this bracket, and consequently the position of lid 42 relative to the restricted passage 41, may be adjusted by a screw 45.

Up to this point, the structure of the pulse generator 11 conforms closely to that of the thermostat described in the above-mentioned Fortier patent. This invention, however, adds to that basic structure a passage 46 which extends between the chamber 17 and the working chamber 26 and is provided with a second adjustable restrictor or needle valve 47. It is the provision of this passage 46 which causes the thermostat to produce a pulsating output pressure in branch line 13.

When the plate valve 21 of the pulse generator 11 is in the position shown in FIG. 1, and assuming that needle valve 29 and lid 42 are closed, supply air entering chamber 25 through line 12 passes to chamber 17 via passage 24 and then flows to the branch line 13. This air is also transmitted to the working chamber 26 through passage 46 and past needle valve 47. Since lid 42 is closed, the pressure in working chamber 26 rises thereby causing diaphragm 31 and plate 32 to move lever 33 in a counter-clockwise direction about its pivot 34. When the lever 33 reaches the position at which the snap action mechanism operates, valve 21 will be moved rapidly into sealing engagement with seat 19 to cut off the supply of air to the branch line 13 and working chamber 26 and vent this line and chamber to atmosphere through vent passage 23. The air in working chamber 26 now escapes to atmosphere past needle valve 47 thereby gradually dissipating the pressure in that chamber. This action allows lever 33 to move in a clockwise direction under the bias of spring 35. When the lever reaches the position in which the snap action mechanism again operates, valve 21 is shifted back into sealing engagement with seat 18. The cycle will begin again and continue to repeat as long as lid 42 remains closed. Since the branch line 13 is connected with chamber 17, the pressure in this line will assume either of two values, namely atmospheric pressure and supply pressure. When the pressure in working chamber 26 is rising, the branch line will be at supply pressure and, when the pressure in that chamber is falling, the branch line will be at atmospheric pressure. It will be realized that these pulsations in branch line pressure serve to periodically open and close switch 14.

The duration of the high pressure pulse in the branch line depends upon the restriction afforded by needle valve 47 because the setting of this valve determines the rates at which the pressure in working chamber 26 increases and decreases. The length of this pulse also depends upon the position of lid 42 relative to restricted passage 41.

The air flowing into and out of working chamber 26 must pass through needle valve 47, and for simplicity, it will be assumed that the rate of flow through this restriction is directly proportional to the pressure drop across it. Based on this assumption, the rate of change of pressure in working chamber 26 can be expressed mathematically by the following equation:

(1) $$\frac{dP}{dt} = k(P_1 - P)$$

where:
P is the pressure in working chamber 26
$P_1$ is the pressure in chamber 17
$t$ is time
$k$ is a proportionality constant dependent upon the setting of needle valve 47.

Solving the Equation 1 for P, we have:

(2) $$P = P_1(1 - e^{-kt})$$

If it is assumed that the supply pressure is 15 p.s.i.g., and remembering the previous assumption that lid 42 is closed, the pressure $P_1$ in working chamber 26 will vary gradually between 0 p.s.i.g. and 15 p.s.i.g. according to Equation 2. The pressure build-up and decay are illustrated graphically by curve A in FIG. 2 and curve A' in FIG. 3, respectively. As a practical matter, the snap action mechanism prevents the pressure in working chamber 26 from reaching either of these limiting values because it operates at two intermediate pressures to shift valve 21 and reverse the direction in which the pressure is changing. In a typical case, this mechanism is designed to shift valve 21 into engagement with seat 19 and open the exhaust passage 23 when the rising pressure in working chamber 26 reaches 10 p.s.i.g., and to shift the valve 21 into engagement with seat 18 and open the supply passage 24 when the falling pressure in the working chamber 26 reaches 5 p.s.i.g. In other words, when the pulse generator is first put in operation, the pressure in working chamber 26 rises according to curve A from 0 to 10 p.s.i. and then falls from that value to 5 p.s.i. along the curve A'. When the lower pressure is reached, the snap action mechanism shifts valve 21 into engagement with seat 18 and permits the pressure to rise again along the curve A. The curve B of FIG. 4 illustrates two cycles of this operation. It will be realized that the rising portion of this curve is identical to that portion of curve A included between the abscissas 48 and 49 and that the falling portions of the curve B are identical to that portion of curve A' between the abscissas 48' and 49'. From curve B, it can be seen that the time during each cycle that the branch line 13 is pressurized (termed "on" in FIG. 4) is equal to the time during which that line is vented (termed "off").

If lid 42 is moved away from passage 41 a short distance so that air can escape from this passage, the maximum pressure which can be established in working chamber 26 decreases. The magnitude of the new maximum limit depends upon the degree of opening of the leak port. When the opening of the leak port is such that the maximum pressure is 10.5 p.s.i.g., pressure builds up in working chamber 26 according to curve C of FIG. 2 and decays in accordance with curve C' of FIG. 3. As in the previous case, the snap action mechanism prevents the pressure from rising above 10 p.s.i.g. and falling below 5 p.s.i.g., and, therefore, the actual pressure variation in chamber 26 is represented by the curve D of FIG. 5. This curve is derived from curves C and C' in the same manner as curve B was derived from curves A and A'.

In comparing the curves C and C' with A and A', respectively, it will be seen that when the leak port is open, the time required for the pressure to build up from 5 to 10 p.s.i. (abscissa 51 minus abscissa 52) is much greater than when the leak port is closed, whereas the time required for the pressure to decay from 10 to 5 p.s.i. (abscissa 51' minus abscissa 52') remains substantially unchanged. Because of this, and as shown in FIG. 5, the "on" time during each pulsation cycle increases as the leak port is opened. It will be understood that curves C, C' and D represent the pressure conditions applicable only to one setting of the leak port and that as the leak port is opened gradually from the fully closed position, the "on" time increases gradually. When the leak port is fully open, the maximum pressure which can be established in working chamber 26 is less than 10 p.s.i.g. and, since this pressure is incapable of operating the snap action mechanism, the "on" time is infinite. In other words, the branch line will be subject to a constant rather than a pulsating pressure.

It should now be clear that with needle valve 29 closed, movement of lid 42 has the effect of varying the duration of the pressure pulse during each cycle between a first limit which is one-half of the cycle and a second limit which is the entire cycle. This range of pulse modulation is useful in some environments but, as far as the preferred embodiment is concerned, something further is required. An additional range of pulse length modulation is realized by opening needle valve 29.

When needle valve 29 is opened, working chamber 26 is placed in continuous communication with supply chamber 25 and so, even neglecting the effect of the snap action mechanism, the pressure in working chamber 26 can never drop to zero. With the lid 42 closed, the ratio of the resistances to flow afforded by needle valves 29 and 47 determines the minimum pressure which could be established in the working chamber 26 and, using the assumed supply pressure and operating limits of the snap action mechanism, this minimum would be 5.5 p.s.i.g. This pressure is not low enough to permit the snap action mechanism to shift valve 21 into engagement with seat 18 and, therefore, the branch line 13 is vented continuously whenever the lid 42 is closed.

As lid 42 is moved gradually away from passage 41, both the maximum and the minimum pressures which can be established in working chamber 26 decrease. When the degree of opening of the leak port is such that the maximum and minimum pressures are 13.5 and 4 p.s.i.g., respectively, the pressure decay and pressure build-up curves would appear as shown by curves E and E' of FIGS. 6 and 7. Curves F and F' of these figures illustrate the pressure curves characteristic of a greater opening of the leak port. An inspection of these curves will show that opening movement of the lid 42 causes the generator to pulsate and to produce pressure pulses of gradually increasing duration. When the lid 42 is open the amount corresponding to curves E and E', the time variation of pressure in working chamber 26 is represented by curve G of FIG. 8. Under these conditions, the "off" time is longer than the "on" time. As the lid 42 opens further, a point will be reached where the "on" and "off" times are equal and the time variation of pressure curve will be generally similar to curve B of FIG. 4. When the lid opening produces the curves F and F', the "on" time is then greater than the "off" time, as shown by curve H of FIG. 9. At the full open position of lid 42, the maximum pressure which can be established in working chamber 26 is less than 10 p.s.i.g. and consequently the branch line 13 is subject continuously to supply pressure.

When the device of FIG. 1 is put in operation, screw 45 is adjusted to establish that relationship between lid 42 and passage 41 which produces equal "on" and "off" times (see FIG. 4) when the temperature sensed by the bimetallic bar 43 is at the set point. If the temperature decreases below the set point, the bimetallic bar 43 moves lid 42 away from passage 41 thereby increasing the ratio of the "on" time to the "off" time. This action maintains the switch 14 closed for a longer portion of each pulsation cycle and thus causes more heat to be admitted into the space whose temperature is being controlled. A temperature change in the opposite direction increases the "off" time in relation to the "on" time and thus allows the heater to operate for a shorter portion of each pulsation cycle.

As stated previously, the drawings and description relate only to the preferred embodiment of the invention. Since many changes can be made in the structure of this embodiment without departing from the inventive concept, the following claims should provide the sole measure of the scope of the invention.

What is claimed is:

1. In combination, a supply passage, a branch passage, and an exhaust passage; a valve connected with the three passages and shiftable between a first position in which the branch passage is connected with the exhaust passage and a second position in which the branch passage is connected with the supply passage; a fluid pressure motor having a working chamber and a movable element subject to the pressure in that chamber; yielding biasing means urging the valve toward one of said two positions; means including a snap-action device connecting the movable element of the motor with the valve; a first restricted passage establishing continuous communication between the branch passage and the working chamber; and a second restricted passage connected with the working chamber for venting same.

2. The combination defined in claim 1 including means associated with one of the restricted passages for varying the restriction afforded by that passage.

3. The combination defined in claim 2 including a third restricted passage connecting the supply passage with the working chamber.

4. The combination defined in claim 3 in which the means for varying restriction is associated with the second restricted passage.

5. Condition controlling apparatus comprising control means for varying a condition; a pressure responsive actuator connected with the control means for causing it to change the condition in opposite senses; a source of pneumatic pressure; a supply passage connected with the source; a branch passage connected with the pressure responsive actuator; an exhaust passage; a valve connected with the three passages and shiftable between a first position in which the branch passage is connected with the exhaust passage and a second position in which the branch passage is connected with the supply passage; a fluid pressure motor having a working chamber and a movable element subject to the pressure in that chamber; yielding biasing means urging the valve toward one of said two positions; means including a snap-action device connecting the movable element of the motor with the valve; a first passage containing a flow restriction and establishing continuous communication between the branch passage and the working chamber; a second passage venting the working chamber to atmosphere; a variable restrictor controlling flow through the second passage; and means responsive to the condition being controlled and connected with the variable restrictor for varying the restriction it affords in accordance with changes in the condition.

6. Condition controlling apparatus as defined in claim 5 including a third passage containing a flow restriction and connecting the working chamber with the supply passage.

References Cited in the file of this patent

UNITED STATES PATENTS

| | | |
|---|---|---|
| 1,109,913 | Fortier | Sept. 8, 1914 |
| 2,562,201 | Merwin | July 31, 1951 |
| 2,651,468 | Joesting | Aug. 8, 1953 |
| 2,685,277 | Schroyer | Aug. 3, 1954 |